(12) United States Patent
Fujii et al.

(10) Patent No.: US 7,628,518 B2
(45) Date of Patent: Dec. 8, 2009

(54) BICYCLE HUB WITH ELECTRICITY GENERATING MECHANISM AND AT LEAST ONE LAMP

(75) Inventors: Kazuhiro Fujii, Kawachinagano (JP); Koji Uno, Osaka (JP)

(73) Assignee: Shimano Inc., Osaka (JP)

( * ) Notice: Subject to any disclaimer, the term of this patent is extended or adjusted under 35 U.S.C. 154(b) by 682 days.

(21) Appl. No.: 10/792,857

(22) Filed: Mar. 5, 2004

(65) Prior Publication Data
US 2004/0189112 A1 Sep. 30, 2004

(30) Foreign Application Priority Data
Mar. 28, 2003 (JP) .............................. 2003-090569

(51) Int. Cl.
*B62J 6/12* (2006.01)
*B60B 27/06* (2006.01)
(52) U.S. Cl. ................. 362/476; 362/192; 362/475; 362/543; 310/67 A; 310/168; 301/110.5
(58) Field of Classification Search ......... 362/473–476, 362/543, 253, 192, 544; 180/205; 310/168, 310/67, 67 A; 429/244; 301/110.5
See application file for complete search history.

(56) References Cited

U.S. PATENT DOCUMENTS

| | | | | |
|---|---|---|---|---|
| 927,812 A | * | 7/1909 | Pumpelly | 429/244 |
| 2,505,154 A | * | 4/1950 | Smith | 315/78 |
| 2,630,480 A | * | 3/1953 | Johnson et al. | 340/432 |
| 2,788,763 A | * | 4/1957 | Ries | 116/56 |
| 3,921,741 A | * | 11/1975 | Garfinkle et al. | 180/205 |
| 4,191,988 A | * | 3/1980 | Kumakura | 362/473 |
| 4,860,176 A | * | 8/1989 | Bauwens et al. | 310/67 A |
| 5,128,840 A | * | 7/1992 | Seki et al. | 362/473 |
| 5,828,145 A | * | 10/1998 | Nakamura | 310/67 A |
| 6,059,431 A | * | 5/2000 | Ellis, Jr. | 362/500 |
| 6,409,197 B1 | | 6/2002 | Endo et al. | |
| 6,418,041 B1 | | 7/2002 | Kitamura | |
| 6,454,445 B1 | * | 9/2002 | Liaw et al. | 362/473 |
| 6,550,945 B2 | * | 4/2003 | Chiu | 362/473 |
| 6,565,242 B2 | * | 5/2003 | Dai | 362/473 |
| 2002/0136020 A1 | * | 9/2002 | Hung | 362/473 |
| 2002/0185909 A1 | * | 12/2002 | Nishimoto | 301/105.1 |
| 2003/0227223 A1 | * | 12/2003 | Hung | 310/75 C |

FOREIGN PATENT DOCUMENTS

| | | |
|---|---|---|
| FR | 927 812 A | 11/1947 |
| JP | 2000-069731(A) | 3/2000 |
| JP | 2001-245475 (A) | 9/2001 |
| WO | WO-98/03236 A | 1/1998 |

\* cited by examiner

*Primary Examiner*—Ismael Negron
(74) *Attorney, Agent, or Firm*—Global IP Counselors, LLP

(57) ABSTRACT

A bicycle hub includes a hub shaft, a hub shell, a bearing arrangement, an electricity generating mechanism and at least one lamp. The hub shaft is configured and arranged to be mounted in a non-rotatable manner to a bicycle frame. The hub shell has a hollow interior with the hub shaft being disposed in the hollow interior of the hub shell. The bearing arrangement is arranged between the hub shell and the hub shaft in such a manner that the hub shell can rotate freely with respect to the hub shaft. The electricity generating mechanism is arranged inside the hub shell and is configured to generate electricity in response to relative rotation of the hub shell with respect to the hub shaft. The lamp is arranged on at least one end of the hub shell and illuminated using electricity generated by the electricity generating mechanism.

22 Claims, 12 Drawing Sheets

BICYCLE HUB WITH ELECTRICITY GENERATING MECHANISM AND AT LEAST ONE LAMP

BACKGROUND OF THE INVENTION

1. Field of the Invention

The present invention generally relates to a bicycle hub. More particularly, present invention relates to a bicycle hub with an electricity generating mechanism.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

The bicycle hubs serve as the bicycle wheel axles. Generally, a bicycle hub includes a hub shaft mounted in a non-rotatable but freely detachable manner to the fork (frame) of a bicycle, a tubular hub shell mounted in a freely rotatable manner to the hub shaft, and a bearing that supports the hub shell in a freely rotatable manner on the hub shaft.

Among bicycle hubs configured in this fashion, there are known bicycle hubs that have an electricity generating mechanism that serves as a power source for such items as a lamp built into the hub shell (see for example Japanese Laid-Open Patent Publication No. 2000-69731). When an electricity generating mechanism is built into the hub shell, the electric generating efficiency improves and the wheel rotation loss decreases in comparison with electricity generating devices that contact the wheel rim (the annular metal portion that secures the tire).

In the bicycle hub disclosed in Japanese Laid-Open Patent Publication No. 2000-69731, the lamp is mounted to a lamp stay provided on the front fork. Consequently, wires are drawn out of the hub shaft of the wheel and connected to the lamp mounted to the front fork.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

The wiring work associated with a conventional bicycle hub, such as disclosed in Japanese Laid-Open Patent Publication No. 2000-69731, is complicated because it is necessary to run wiring from the electricity generating mechanism installed inside the bicycle hub to the lamp at the bicycle assembly plant. Furthermore, since the wiring to the lamp is exposed to the outside, it is possible for the wiring to catch on something and be broken. Also, the work associated with changing the wheel is complicated because the wiring must be disconnected from the bicycle hub or the lamp when the wheel is removed and connected to the bicycle hub or the lamp when the wheel is installed. Thus, such conventional hubs carry the risk of incurring problems associated with the wiring because the wiring must be run from the bicycle hub to the lamp and the wiring is exposed.

The object of the present invention is to provide a bicycle hub that minimizes the trouble associated with lamp wiring from occurring in bicycle hubs having an electricity generating mechanism.

A bicycle hub in accordance with a first aspect of the present invention basically includes a hub shaft, a hub shell, a bearing arrangement, an electricity generating mechanism and at least one lamp. The hub shaft is configured and arranged to be mounted in a non-rotatable manner to a bicycle frame. The hub shell has a hollow interior with the hub shaft being disposed in the hollow interior of the hub shell. The bearing arrangement is arranged between the hub shell and the hub shaft in such a manner that the hub shell can rotate freely with respect to the hub shaft. The electricity generating mechanism is arranged inside the hub shell and configured to generate electricity in response to relative rotation of the hub shell with respect to the hub shaft. The lamp is arranged on at least one end of the hub shell and illuminated using electricity generated by the electricity generating mechanism.

With this bicycle hub, the electricity generating mechanism generates electricity when the wheel rotates and the hub shell rotates relative to the hub shaft. The generated electric power is delivered to the least one lamp arranged on at least one end of the hub shell. Since the least one lamp is arranged on at least one end of the hub shell, the wiring from the electricity generating mechanism to the lamp is not easily exposed to the outside of the hub. Consequently, problems resulting from exposure of the wiring can be eliminated. Furthermore, since the wiring work can be completed at the bicycle hub manufacturing plant instead of the bicycle assembly plant, the bicycle assembly plant can focus solely on assembling the wheel using the bicycle hub and does not need to wire the lamp. Consequently, problems associated with wiring work can be eliminated. Also, the lamp(s) can be changed simultaneously with the wheel when the wheel is changed. Consequently, problems associated with handling the wiring when the wheel is changed can be eliminated. Moreover, the need to separately mount the lamp to the bicycle is eliminated because the lamp can be installed by mounting the bicycle hub to the bicycle frame.

In accordance with a second aspect of the present invention, the hub of the first aspect of the present invention is configured such that the lamp(s) is mounted in a non-rotatable manner to the hub shaft. With this bicycle hub, there is no need to adjust the beam angle of the lamp once the hub shaft is fastened to the frame because the lamp is mounted in a non-rotatable manner to the hub shaft.

In accordance with a third aspect of the present invention, the hub of the first or second aspect of the present invention is configured such that there are two of said lamps and the lamps are arranged such that one lamp is located at each end of the hub shell. With this bicycle hub, the shadow of the wheel rim that forms when the lamps shine forward can be erased.

In accordance with a fourth aspect of the present invention, the hub of the third aspect of the present invention is configured such that the two lamps are arranged between the frame and each end of the hub shell. With this bicycle hub, it is easy to integrate the hub shell and the lamps into a single unit because no portion of the frame, e.g., the front fork, is disposed between the lamp and the hub shell.

In accordance with a fifth aspect of the present invention, the hub of the third or fourth aspect of the present invention is configured such that the two lamps are connected in series with respect to the electricity generating mechanism. With this bicycle hub, the switch circuitry and switch operation can be simplified because the two lamps can be turned on and off with one switch.

In accordance with a sixth aspect of the present invention, the hub of the third or fourth aspect of the present invention is configured such that the two lamps are connected in parallel with respect to the electricity generating mechanism. With this bicycle hub, the illuminance of the lamps can be adjusted in two stages in accordance with the ambient brightness because the two lamps can be turned on and off separately. Additionally, one of the lamps will continue to shine even if the other burns out or becomes disconnected.

In accordance with a seventh aspect of the present invention, the hub of any one of the first through sixth aspects of the present invention is configured such that at least one switch is provided in the circuitry between the electricity generating mechanism and the lamp(s) for turning the lamp(s) on and off. With this bicycle hub, the lamp(s) can be turned on and off with a switch.

In accordance with an eighth aspect of the present invention, the hub of the seventh aspect of the present invention is configured such that the switch is configured to be turned on and off manually. With this bicycle hub, the switch circuitry is inexpensive because the switch is turned on and off manually.

In accordance with a ninth aspect of the present invention, the hub of the seventh aspect of the present invention is configured such that an illuminance sensor is provided to detect the ambient brightness surrounding the bicycle; and the switch is configured to turn on and off in response to the output of the illuminance sensor. With this bicycle hub, the lamp(s) turns on and off automatically in accordance with the ambient brightness and troublesome manual operations to turn the lamp(s) on and off are unnecessary.

With the present invention, since the lamp(s) is arranged on at least one end of the hub shell, it is difficult for the wiring from the electricity generating mechanism to the lamp(s) to become exposed to the outside of the hub. Consequently, problems resulting from exposure of the wiring can be eliminated. Furthermore, since the wiring work can be completed at the bicycle hub manufacturing plant instead of the bicycle assembly plant, the bicycle assembly plant can focus solely on assembling the wheel using the bicycle hub and does not need to wire the lamp. Consequently, problems associated with wiring work can be eliminated. Also, the lamp(s) can be changed simultaneously with the wheel when the wheel is changed. Consequently, problems associated with handling the wiring when the wheel is changed can be eliminated. Moreover, the need to mount the lamp to the bicycle is eliminated because the lamp can be mounted by mounting the bicycle hub to the bicycle frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
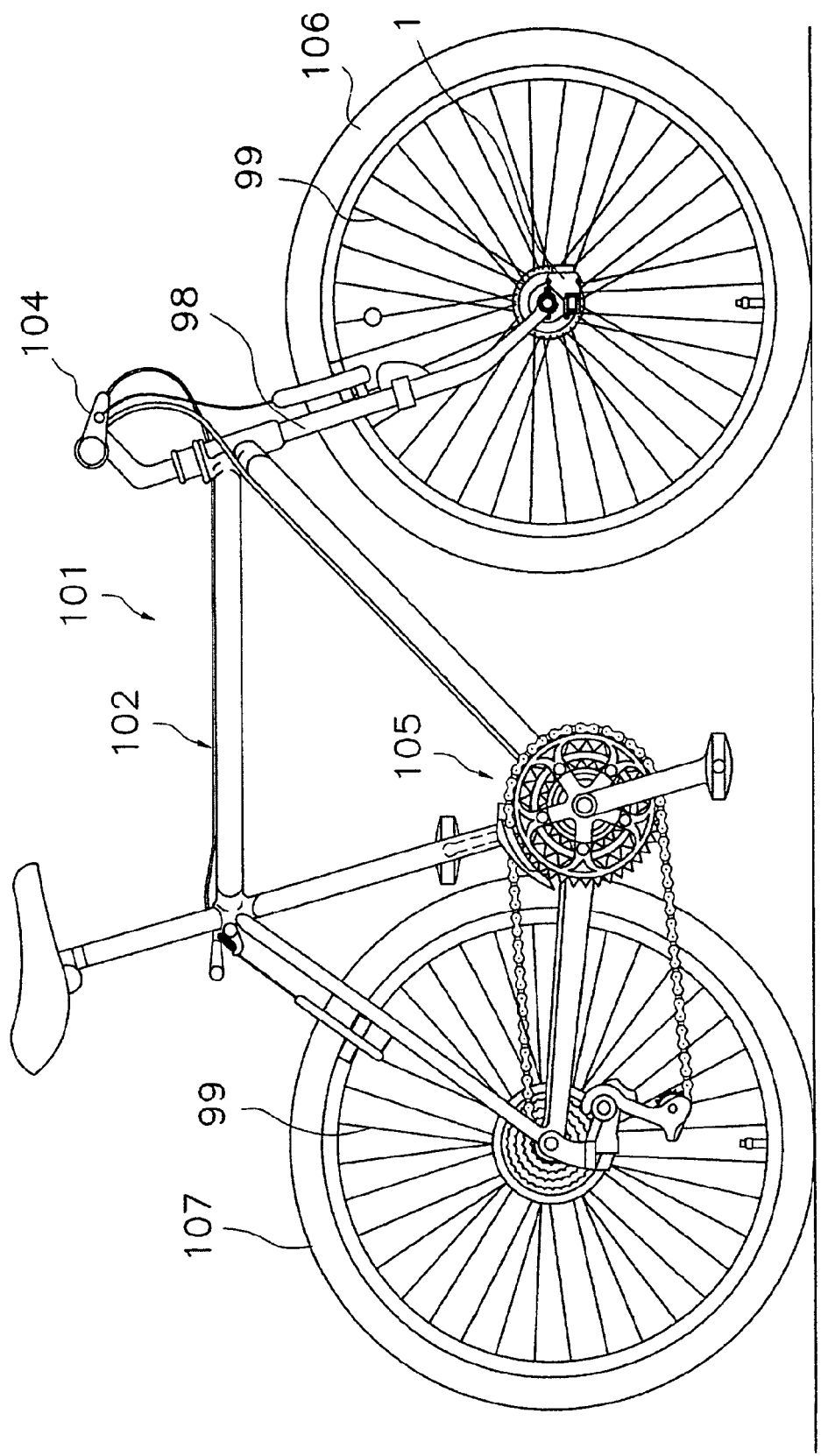
FIG. 1 is a schematic view of a bicycle in which a front hub in accordance with a preferred embodiment of the present invention.

Referring initially to FIG. 1, a bicycle 101 is illustrated that is equipped with a front hub 1 in accordance with a first embodiment of the present invention. The bicycle 101 is provided with the following: a frame 102 that includes a front fork 98; a handlebar 104; a drive section 105 comprising a chain, pedals, etc.; and a front wheel 106 and rear wheel 107 having spokes 99.

Figure 2:
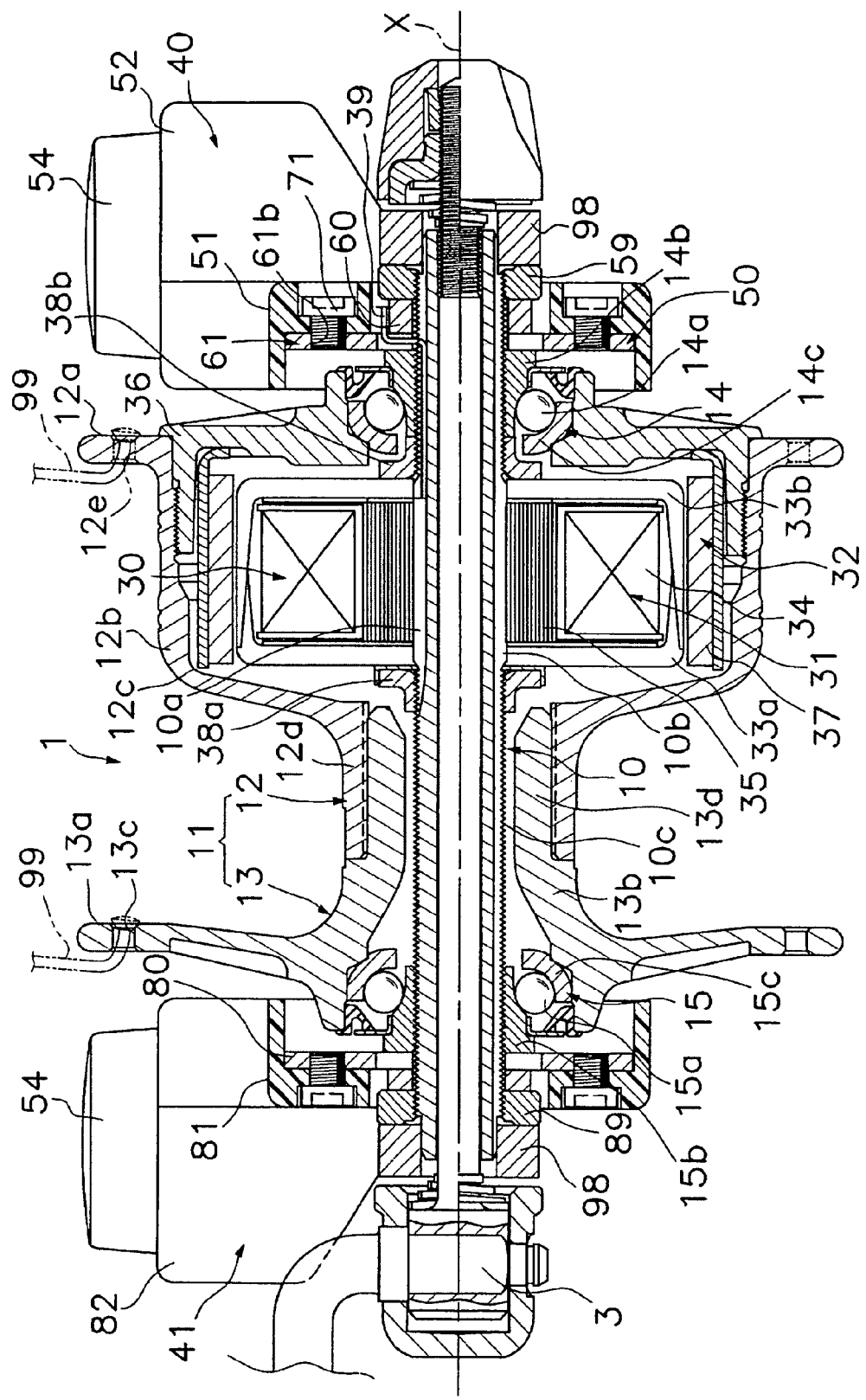
FIG. 2 is a longitudinal cross sectional view of the front hub in accordance with the preferred embodiment of the present invention.

The front hub 1 in accordance with the illustrated embodiment of the present invention is mounted to the tip end of the front fork 98. As shown in FIG. 2, the front hub 1 is provided with both an electricity generating function and a front lamp function. When the front hub 1 assembled into the front wheel 106 and mounted to the front fork 98 of the bicycle 101, an arrangement is obtained in which generated electric power can be delivered to the front lamp without performing any wiring work.

As shown in FIG. 2, the ends of the hub shaft 10 of the front hub 1 are fixed to the left and right prongs of the front fork 98 and the hub flanges 12a and 13a are fixed to the spokes 99. The axis X shown in FIG. 2 is the rotational axis of the front wheel 106 of the bicycle 101.

As shown in FIG. 2, the front hub 1 is provided with a hub shaft 10, a hub shell 11 having first and second tubular members 12 and 13, a pair of bearings 14 and 15, a generator (electricity generating mechanism) 30, and first and second lamp units 40 and 41.

Figure 3:
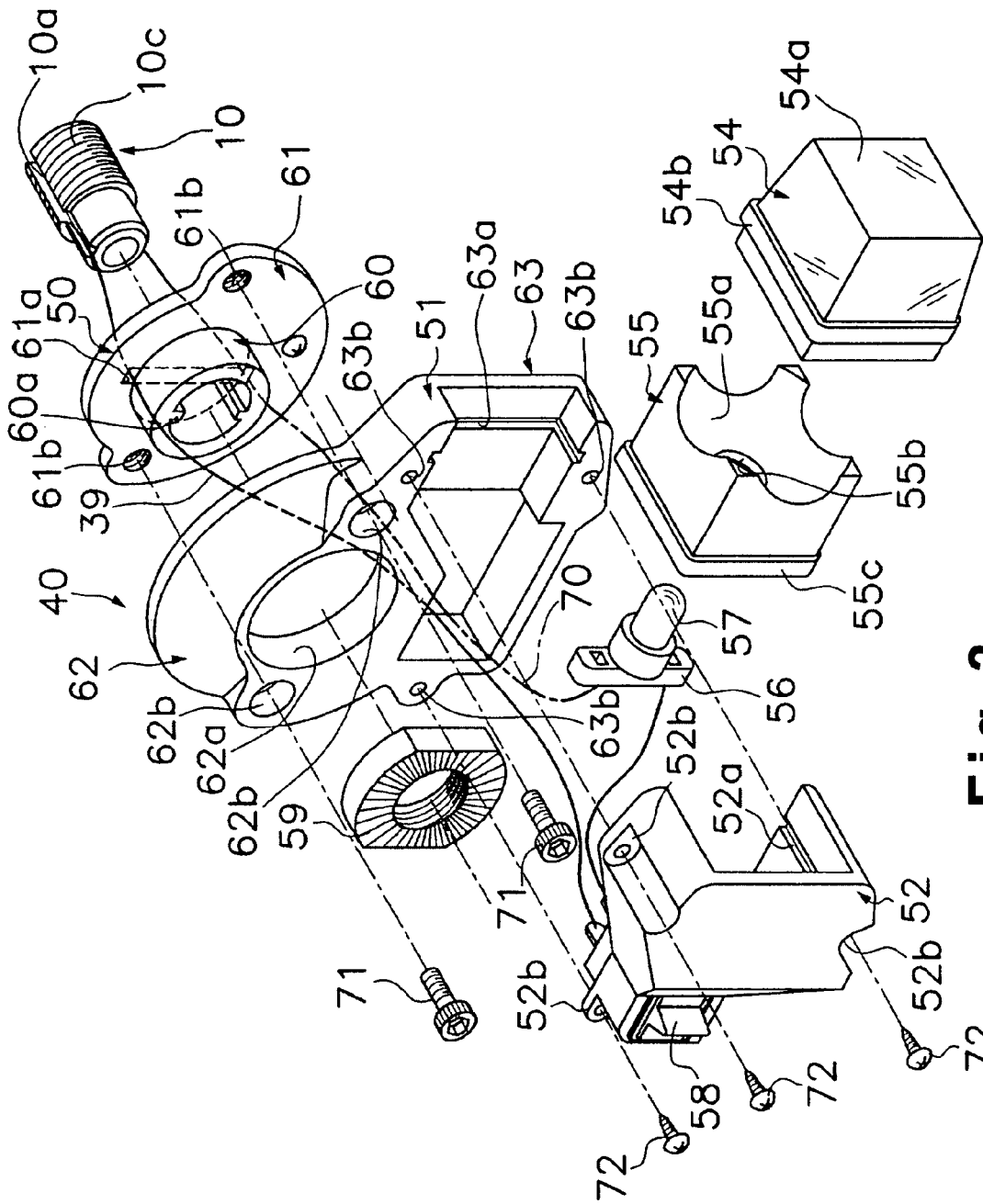
FIG. 3 is an exploded perspective view of the first lamp unit of the front hub in accordance with the preferred embodiment of the present invention.

The ends of the hub shaft 10 are fixed to the tip ends of the front fork 98 with an adjusting nut 2 and a cam lever 3. The stator yokes 33a and 33b and the cylindrical core yoke 35 of the generator 30 (discussed later) are fixed to the hub shaft 10. Axially-oriented wire grooves 10a and 10b are provided in the radially outward-facing surface of the hub shaft 10 for running a wire 39 from the generator 30 and a wire 70 for connecting the lamp units 40 and 41 (FIG. 3). The wire groove 10a is provided for running the wire 39 from the generator 30.

In this embodiment, the wire groove 10a is formed to extend from the mounting portion of the generator 30 to the right end of the hub shaft 10 (where "right" is from the perspective of FIG. 2). The wire groove 10b is for running the wire 70 that connects to the lamp units 40 and 41 and, in this embodiment, is formed to extend across the entire length of the hub shaft 10. The radially outward-facing surface of the hub shaft is provided with external threads 10c, except for the portion where the generator 30 is mounted.

The first tubular member 12 of the hub shell 11 is arranged such that it covers the generator 30. The first tubular member 12 of the hub shell 11 is made of, for example, an aluminum alloy. The first tubular member 12 comprises an annular first hub flange 12a, a first cylindrical part 12b, an annular tapered part 12c, and a cylindrical engaging part 12d.

The first hub flange 12a is provided with a plurality of spoke hooking holes 12e that are arranged with equal spacing in the circumferential direction and whose diameters correspond to the diameter of the spokes 99. The spokes 99 are hooked into the spoke hooking holes 12e. The first cylindrical part 12b is a cylindrical portion that extends to the left (i.e., left as shown in FIG. 2) from the inner circumferential edge of the first hub flange 12a. A cap 36 for the generator 30 is mounted to the radially inward-facing surface of the first cylindrical part 12b. The annular tapered part 12c extends inward from the left end of the first cylindrical part 12b (where "left" is from the perspective of a rear view). The cylindrical engaging part 13d extends to the left from the radially-inner edge of annular tapered part 12c.

The second tubular member 13 is made of, for example, an aluminum alloy. The second tubular member 13 comprises an annular second hub flange 13a and a second cylindrical part 13b. The second cylindrical part 13b extends toward the right from the inner circumferential edge of the second hub flange 13a (where "right" is from the perspective of a rear view). The outer circumferential part of the second hub flange 13a is provided with a plurality of spoke hooking holes 13c that are arranged with equal spacing in the circumferential direction and whose diameters correspond to the diameter of the spokes 99. The spoke hooking holes 13c are offset relative to the spoke hooking holes 12e by a distance of one-half of the pitch. The spokes 99 are hooked into the spoke hooking holes 13c. The second cylindrical part 13b is a cylindrical portion that extends to the right (i.e., right as shown in FIG. 2) from the inner circumferential edge of the second hub flange 13a. The right-hand portion of the second cylindrical part 13b is a cylindrical engaging part 13d. The radially inward-facing surface of the cylindrical engaging part 12d of the first tubular member 12 is crimp-fastened to the radially outward-facing surface of the cylindrical engaging part 13d such that the tubular members 12 and 13 are coupled to each other in a non-rotatable manner.

The bearing 14 comprises a plurality of balls 14a and a ball pushing member 14b and a ball bearing member 14c that retain the balls 14a. The ball pushing member 14b is screw-fastened onto the external threads 10c of the hub shaft 10. The ball bearing member 14c is fixed to a radially inward-facing portion of the cap 36 of the generator 30 (discussed later). As a result, the bearing 14 supports the cap 36 mounted to the generator 30 and the first tubular member 12 mounted to the cap 36 in a freely rotatable manner with respect to the hub shaft 10.

The bearing 15 comprises a plurality of balls 15a and a ball pushing member 15b and ball bearing member 15c that retain the balls 15a. The ball pushing member 15b is screw-fastened onto the external threads 10c of the hub shaft 10. The ball bearing member 15c is fixed to a radially inward-facing portion of the left end of the second tubular member. The bearing 15 supports the second tubular member 13 in a freely rotatable manner with respect to the hub shaft 10.

The generator 30 basically comprises an inner stator 31 and an outer rotor 32. The electric power generated by the generator 30 is delivered to the lamp units 40 and 41 through a wire 39. It is also possible to use the electric power as an electric power source for an external device.

The inner stator 31 basically comprises two claw-shaped stator yokes 33a and 33b, a bobbin 34 on which the coil is wound, and a cylindrical or tubular core yoke 35. The stator yokes 33a and 33b, the bobbin 34, and the cylindrical core yoke 35 are assembled in to a single unit to form the inner stator. The inner stator 31 is fixed in a non-rotatable manner to the hub shaft 10 by being sandwiched between a pair of flange members 38a, 38b that are screwed onto the external threads 10c.

The outer rotor 32 basically comprises a permanent magnet 37 that is mounted to the cap 36 and divided into increments equally spaced in the circumferential direction. The permanent magnet 37 is provided with a total of 28 north and south poles arranged alternately with equal spacing such that each faces a claw of the stator yokes 33a and 33b.

Figure 4:
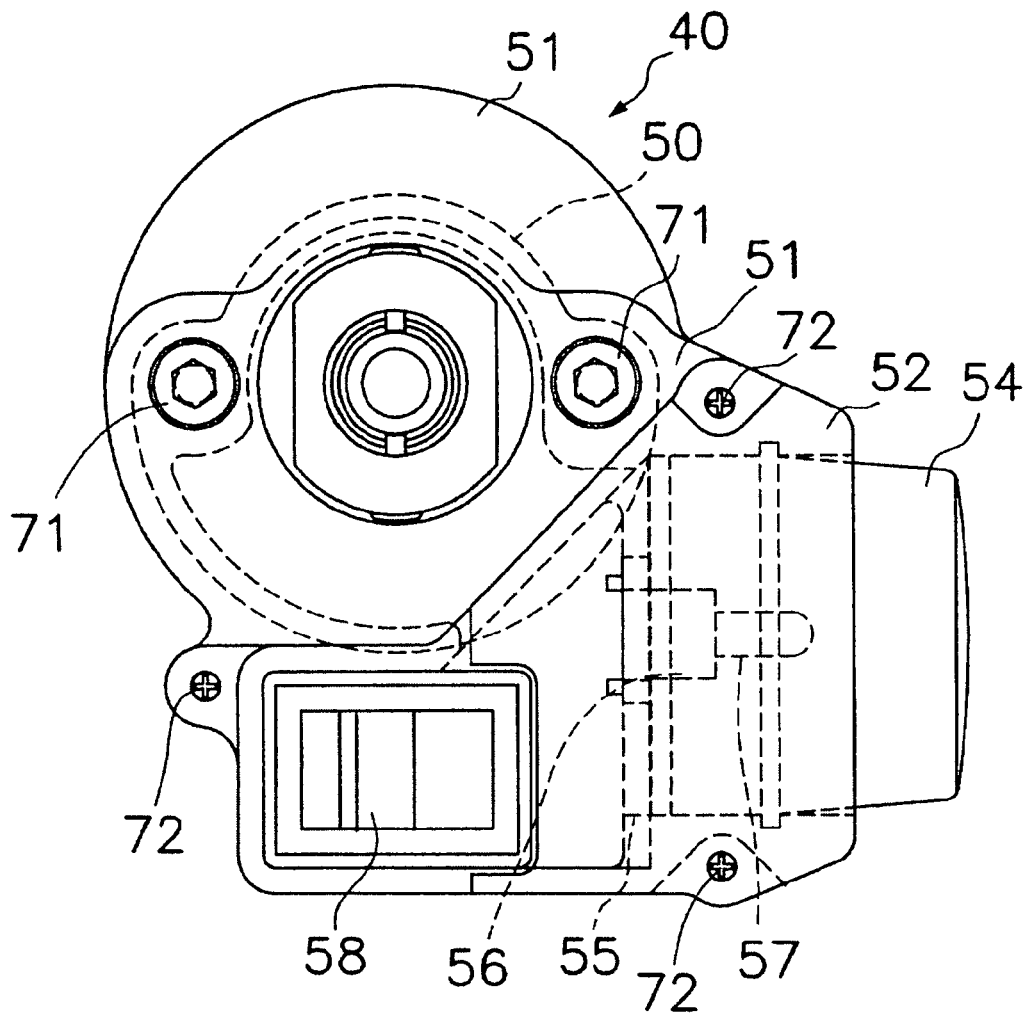
FIG. 4 is a side view of the first lamp unit illustrated in FIG. 3.

The first and second lamp units 40 and 41 are arranged at both ends of the hub shell 11. As shown in FIGS. 3 and 4, the first lamp unit 40 includes a mounting bracket 50, a first case member 51 and a second case member 52. The mounting bracket 50 is fixed in a non-rotatable manner to the hub shaft 10. The first case member 51 is fixed with screws to the mounting bracket 50. The second case member 52 is fixed with screws to the first case member 51. The lamp unit 40 further includes a lens 54 mounted such that it is sandwiched between the two case members 51 and 52, a reflector 55 mounted to the lens 54, a light bulb mounting part 56 hooked to the reflected 55, and a light bulb 57 mounted to the light bulb mounting part 56 in such a manner that can be attached to and detached from the light bulb mounting part 56.

The mounting bracket 50 is a metal member that, using a nut 59 screwed onto the external threads 10c of the hub shaft 10, is fixed in a non-rotatable manner to the hub shaft 10 such that it contacts the ball pushing member 14b (FIG. 2). The mounting bracket 50 includes a tubular part 60 that mounts to the hub shaft 10 and a plate-like part 61 that is fixed to the tubular part 60.

An engaging protrusion 60a that engages with the wire groove 10b of the hub shaft 10 is provided on the radially inward-facing surface of the tubular part 60. Thus, the tubular part 60 engages in a non-rotatable manner with the hub shaft 10.

The plate-like part 61 has a small portion and a large portion each shaped generally like a semicircular disk. The plate-like part 61 is provided with wire slits 61a in positions corresponding to the wire grooves 10a and 10b for passing the wire 39 from the generator 30 and the wire 70 for connecting the lamp units 40 and 41. The wire slits 61a are arranged diametrically opposite each other at positions farther from the rotational axis than the outside diameter of the tubular part 60 so that the wires 39, 70 coming from the wire grooves 10a, 10b can pass along the outside of the tubular part 60. Two threaded holes 61b are formed in the plate-like part 61 for mounting the first case member 51.

Although the wire grooves 10a and 10b are shown in the same cross section as the threaded holes 61b in FIG. 2, they are actually offset from each other by 90 degrees as shown in FIG. 3. The first case member 51 is fastened to the mounting bracket 50 by installing mounting bolts 71 into the threaded holes.

The first case member 51 is made of, for example, synthetic resin and is arranged such that it covers the mounting bracket 50. The first case member comprises a cover part 62 that covers the mounting bracket 50 and a compartment 63 that is formed integrally with the cover part 62 and forms a space for enclosing portions of the lens 54, the reflector 55, and the switch 58 (discussed later). The cover part 62 is provided with a through hole 62a in which the nut 59 can be arranged. The bolt holes 62b are provided on either side of the through hole 62a for passing the two mounting bolts 71. The bolt holes 62b are countersunk so that the head portions of the mounting bolts 71 will rest on the rims of the smaller diameter portion of the holes. A first engaging groove 63a is formed in the inside surface of the front portion of the compartment 63 for retaining the lens 54. The first engaging groove 63a is formed in such a manner that it covers a portion of the perimeter of the lens 54. Three threaded holes 63b are formed in the outward-facing surface of the compartment 63 around the perimeter of the compartment space for mounting the second case member 52.

The second case member 52 is configured so that, together with the compartment 63 of the first case member 51, the second case member 52 houses the lens 54 and reflector 55. The inside surface of the front portion of the second case member 52 is provided with an engaging groove 52a that blends with the first engaging groove 63a and serves to engage with the perimeter of the lens 54.

A switch 58 is mounted to a rear part of the second case member 52. The switch 58 is, for example, a two-position toggle switch that is operated manually and serves to turn the light bulb 57 on and off. Three mounting seats 52b are formed around the periphery of the second case member 52. The mounting screws 72 pass through the mounting seats 52b.

The lens 54 is a box-shaped member made of transparent resin, open in the rear, and slightly tapered in the front. A convex lens part 54a that is slightly bulged in the center (as shown in FIG. 2) is provided on the tip end of the lens 54. A belt-shaped retaining protrusion 54b that protrudes beyond the other portions of the lens is formed around the perimeter of the lens 54. The retaining protrusion 54b engages with the first and second engaging grooves 63a and 52a so that the lens 54 is mounted in the case members 51 and 52 in a secure manner.

The reflector 55 is made of, for example, synthetic resin and shaped such that it fits into the rear opening of the lens 54. The front surface of the reflector 55 is formed into a curved surface 55a that is curved in the center and treated with a reflective coating. A light bulb mounting hole 55b is formed in the center of the reflector 55 through which a light bulb 57 can be passed. A protruding part 55c that abuts against the rear end face of the lens 54 is formed around the outside edge of the rear end of the reflector 55. The outside surface of the protrusion 55c blends in a coplanar manner with the outside surface of the lens 54.

The light bulb mounting part 56 has a socket into which the light bulb 57 is secured. The light bulb mounting part 56 engages in a detachable manner with the rear face of the reflector 55. Two terminals (not shown) that connect electrically to the light bulb 57 are provided on the light bulb mounting part 56 and connected to the wire 39 and, through the switch 58, to the wire 70.

Figure 5:
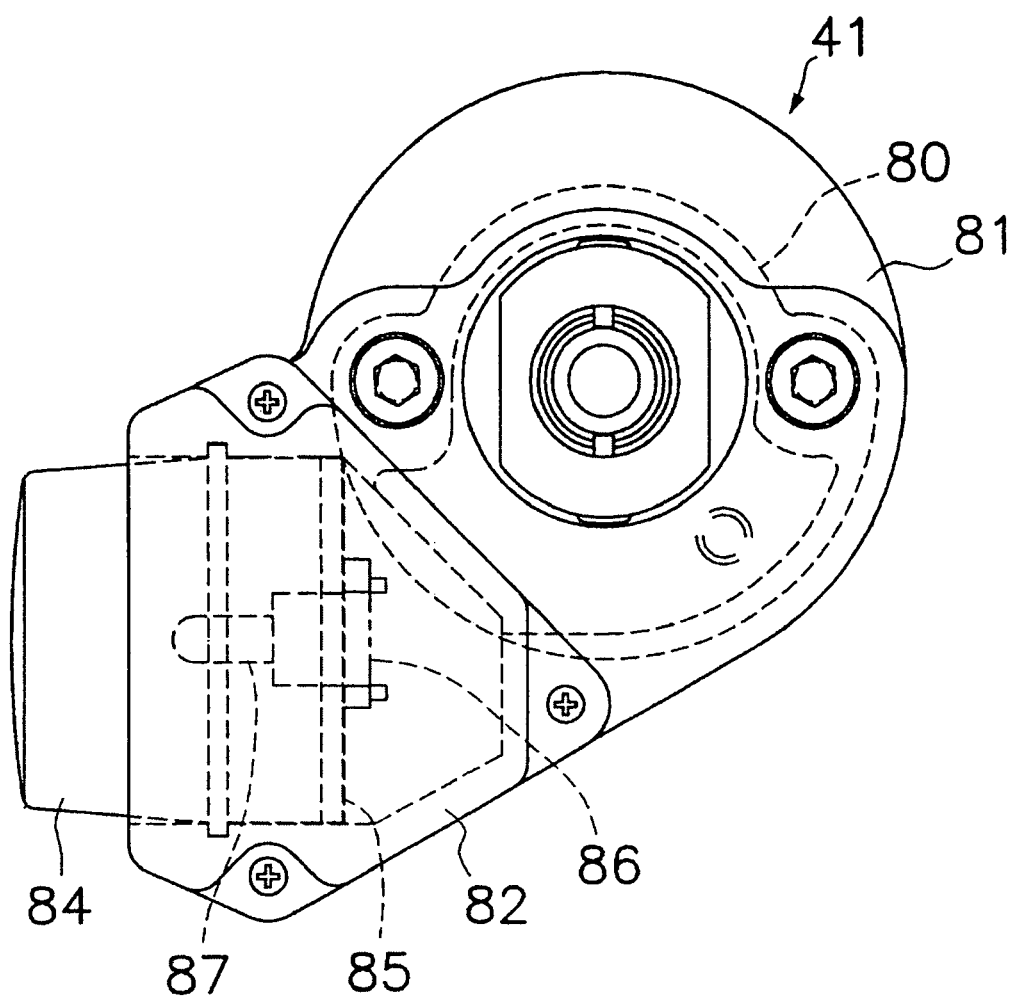
FIG. 5 is a side view of the second lamp unit of the front hub in accordance with the preferred embodiment of the present invention.

The second lamp unit 41 is configured in essentially the same manner as the first lamp unit 40, except that it does not have a switch 58. As shown in FIG. 5, the second lamp unit 41 has a mounting bracket 80, a first case member 81, and a second case member 82. The second lamp unit 41 is also provided with a lens 84, a reflector 85, a light bulb mounting part 86, and a light bulb 87. The mounting bracket 80 has the form of a mirror image of the mounting bracket 50. The first and second case members 81 and 82 have essentially the same form as the first and second case members 51 and 52, except that they do not have a portion for housing the switch 58. The lens 84, the reflector 85, the light bulb mounting part 86, and the light bulb 87 have the same form as the corresponding components of the first lamp unit 40.

The wiring between the first and second lamp units 40 and 41 and the generator 30 will now be described.

Figure 6:
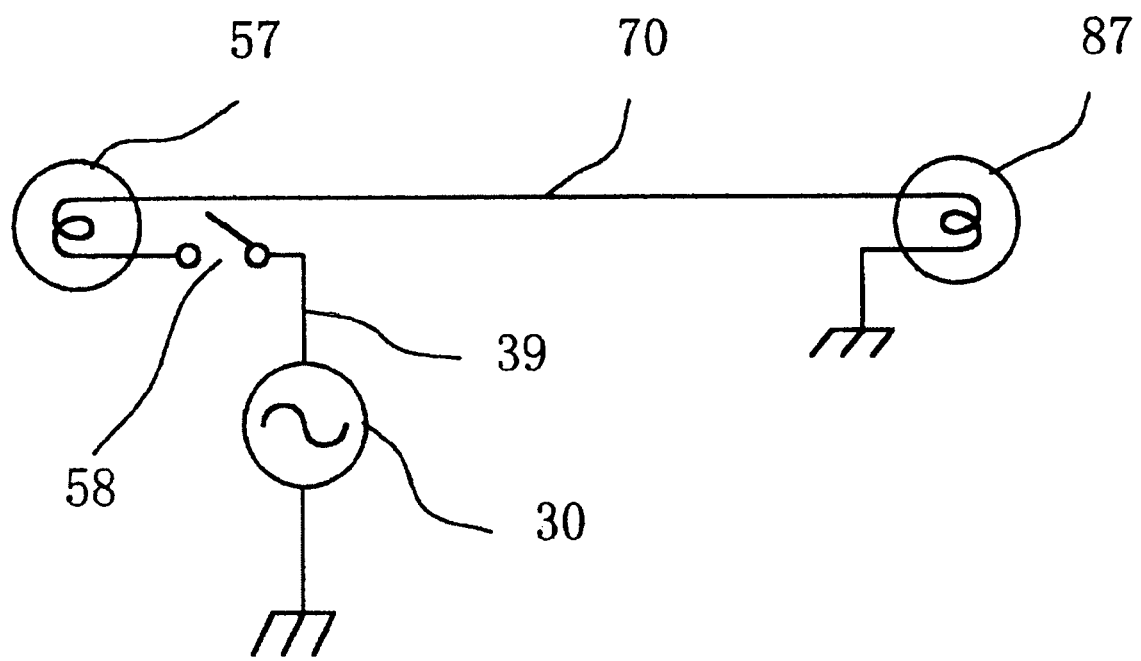
FIG. 6 is a wiring diagram for operating both lamps used in the front hub in accordance with the preferred embodiment of the present invention.

As shown in FIG. 6, in this embodiment the two light bulbs 57 and 87 are connected in series by the wire 70 arranged in the wire groove 10b and the switch 58 is arranged, for example, between the generator 30 and the light bulb 57. It is also acceptable for the switch 58 to be connected between the light bulb 57 and the light bulb 87 or between the light bulb 87 and ground or to be located on the second lamp unit 41. In this way, the two lamp units 40 and 41 can be turned on and off simultaneously with a single switch 58.

The electricity generation of the generator 30 inside the front hub 1 will now be described. When the bicycle 101 moves and the spokes 99 rotate relative to the front fork 98, the outer rotor 32 rotates relative to the inner stator 31 because the inner stator 31 is fixed to the front fork 98 and the outer rotor 32 is fixed to the spokes 99 and can rotate due to the bearing 14. The permanent magnet 37 rotates around the outside of the stator yokes 33a and 33b.

As a result, when one of the stator yokes 33a and 33b receives the north-pole magnetic flux from the permanent magnet 37 the other receives the south-pole magnetic flux, and when one of the stator yokes 33a and 33b receives south-pole magnetic flux from the permanent magnet 37 the other receives north-pole magnetic flux. That is, as the permanent magnet 37 rotates around the outside of the stator yokes 33a and 33b, the generator 30 alternates between a first state in which the stator yoke 33a is aligned with the north pole and the stator yoke 33b is aligned with the south pole, and a second state in which the stator yoke 33a is aligned with the south pole and the stator yoke 33b is aligned with the north pole. Thus, an oscillating magnetic flux is generated along the direction of the axis X in the cylindrical core yoke 35, which magnetically connects the stator yokes 33a and 33b. The oscillating magnetic flux generated inside the bobbin 34 causes a current to be generated in the bobbin 34.

When the switch 58 is on and the bicycle is moving such that electricity is generated, the generated electric power is delivered to the light bulb 57 through the wire 39 and the switch 58 and to the light bulb 87 through the wire 70. As a result, the first and second lamp units 40 and 41 turn on. Since the first and second lamp units 40 and 41 are provided on both sides of the hub shell 11, it is difficult for the wires 39 and 70 from the generator 30 to the lamp units 40 and 41 to be exposed on the outside of the front hub 1. Consequently, problems resulting from exposure of the wiring can be eliminated. Furthermore, since the wiring work can be completed at the plant where the front hub 1 is manufactured instead of the bicycle assembly plant, the bicycle assembly plant can focus solely on assembling a front wheel 106 using the front hub 1 without the need to wire the lamp units 40 and 41. Consequently, problems associated with wiring work can be eliminated. Also, the lamp units 40 and 41 can be changed simultaneously with the front wheel 106 when the front wheel is changed. Consequently, problems associated with handling the wiring when the wheel is changed can be eliminated. Moreover, the need to separately mount the lamp units 40 and 41 to the bicycle is eliminated because the lamp units 40 and 41 can be mounted by installing the front hub 1 to the bicycle frame.

Also, since the lamp units 40 and 41 are arranged on both sides of the hub shell 11, the shadow of the front rim 106 that forms when the lamps shine forward can be erased.

Figure 7:
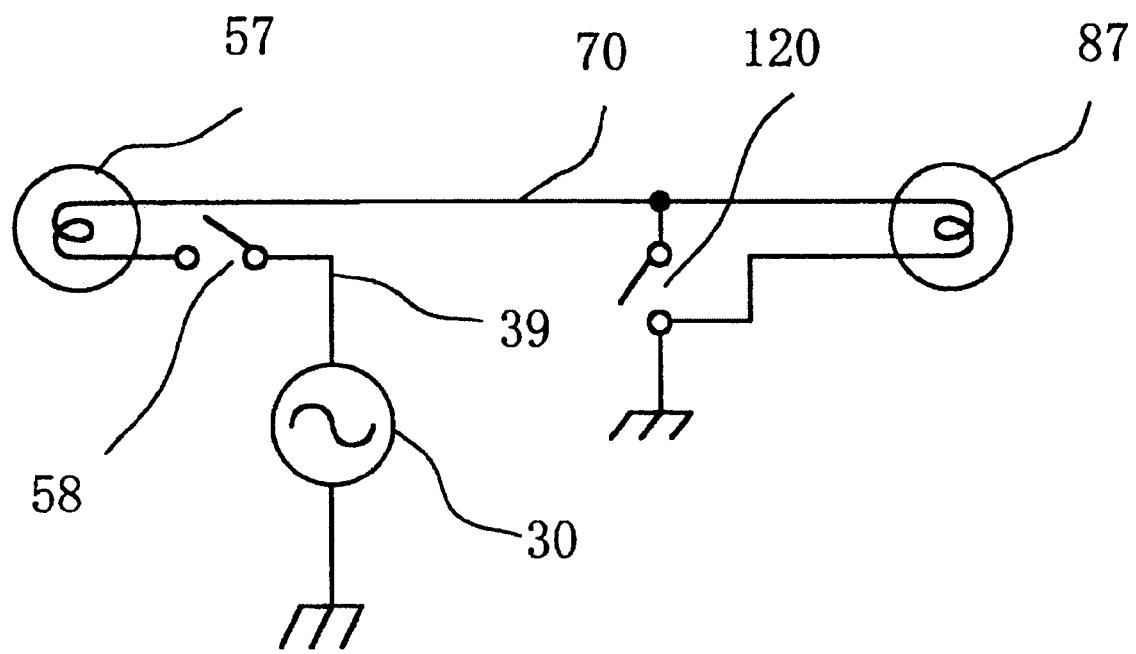
FIG. 7 is an alternate wiring diagram, similar to FIG. 6, for operating both lamps used in the front hub in accordance with the preferred embodiment of the present invention.

Alternate Wiring Arrangements (a) In addition to the previously described embodiment, it is also acceptable to provide a switch 120 in parallel with the light bulb 87 of the second lamp unit 41 to add a circuit that short-circuits the light bulb 87, as shown in FIG. 7. With this arrangement, when the switch 58 is on, the light bulb 87 can be turned on and off by turning the switch 120 on and off. Meanwhile, when the switch 120 is off, both light bulbs 57 and 87 can be turned on and off simultaneously by turning the switch 58 on and off. Additionally, the lamp 57 will continue to shine even if the light bulb 87 burns out or becomes disconnected.

Instead of using two switches 58 and 120, it is also possible to use a three-position switch having an OFF position and two ON positions so that the same switching action as described in the previous paragraph can be achieved with a single switch. Thus, assuming the switch 120 in FIG. 7 is a three-position switch, the previously described switching action can be achieved with a single switch by connecting the three-way switch such that it can turn the wire 70 on, turn the short-circuit on, or turn both off.

Figure 8:
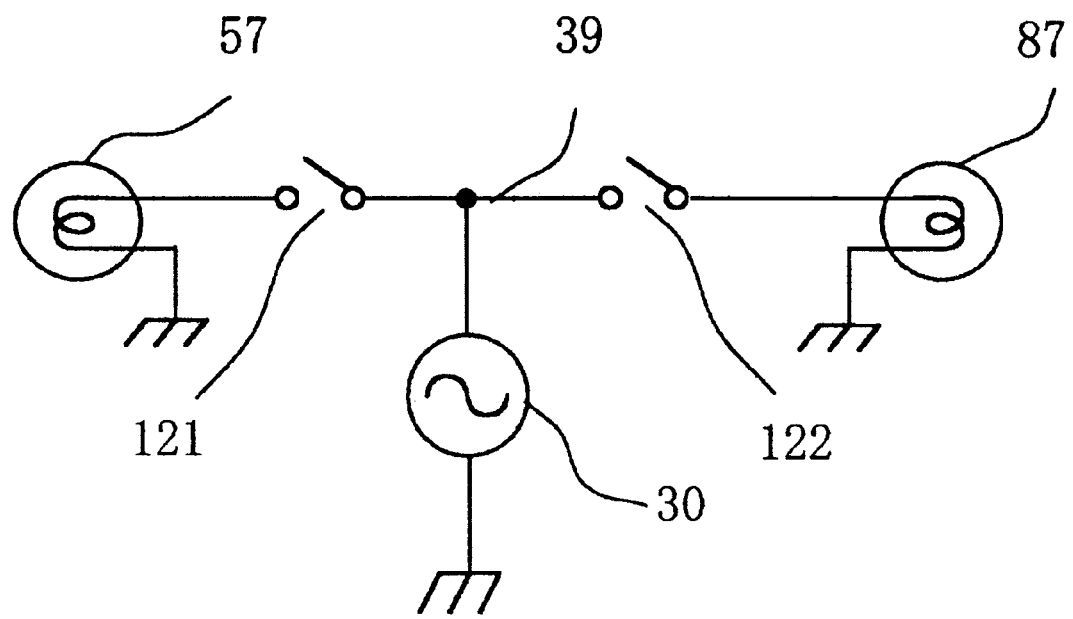
FIG. 8 is an alternate wiring diagram, similar to FIG. 6, for operating both lamps used in the front hub in accordance with the preferred embodiment of the present invention.

(b) It is also acceptable to connect the two light bulbs 57, 87 in parallel instead of series. This can be accomplished by branching the wire 39 to the left and right and connecting the light bulbs 57, 87 through switches 121 and 122, as shown in FIG. 8. With this arrangement, it is necessary to provide a switch 121 or 122 for each of the lamp units 40 and 41. Since only one wire 39 is needed, the only one wire groove 10a need be formed from one end to the other of the hub shaft 10. The lamp units 40 and 41 can be turned on and off individually using the switches 121 and 122 provided on the lamp units 40 and 41, respectively. Furthermore, one lamp can still be turned on even if the other burns out or becomes disconnected.

The two units 40 and 41 of a parallel arrangement can be turned on and off simultaneously with a single switch by providing a switch in front of the branch point. In such a case, two wire grooves are needed in the hub shaft because two wires are needed: a wire leading to the switch and a wire that branches from the switch to both light bulbs 57 and 87.

c) Although the lamp units 40 and 41 were turned on and off using a manual switch in the previous embodiment, it is also acceptable to turn the two lamp units 40 and 41 on and off automatically in accordance with the illuminance of the ambient light, as shown in FIGS. 9 to 12.

Figure 9:
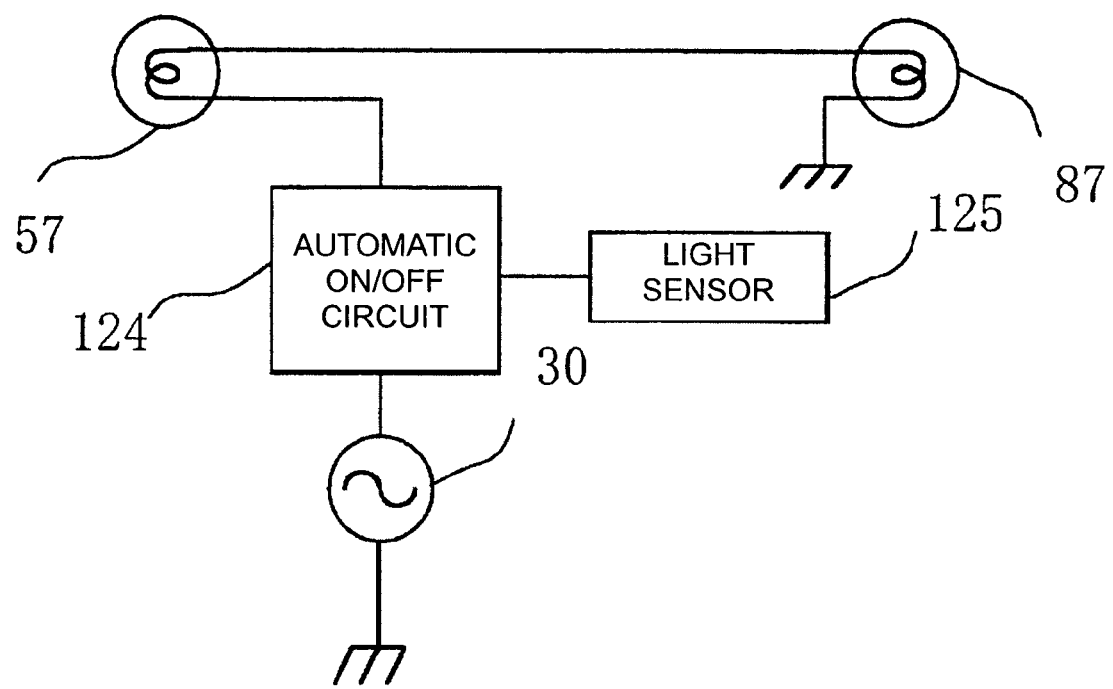
FIG. 9 is an alternate wiring diagram, similar to FIG. 6, for operating both lamps used in the front hub in accordance with the preferred embodiment of the present invention.

In FIG. 9, the light bulbs 57 and 87 of the lamp units 40 and 41 are connected in series and an automatic on/off circuit 124 is arranged between the generator 30 and the light bulb 57. A light sensor 125 is connected to the automatic on/off circuit 124. The automatic on/off circuit 124 turns an internal switch circuit on when the illuminance indicated by the output from the light sensor 125 is less than a prescribed value and off when the illuminance is equal to or greater than a prescribed value.

Figure 10:
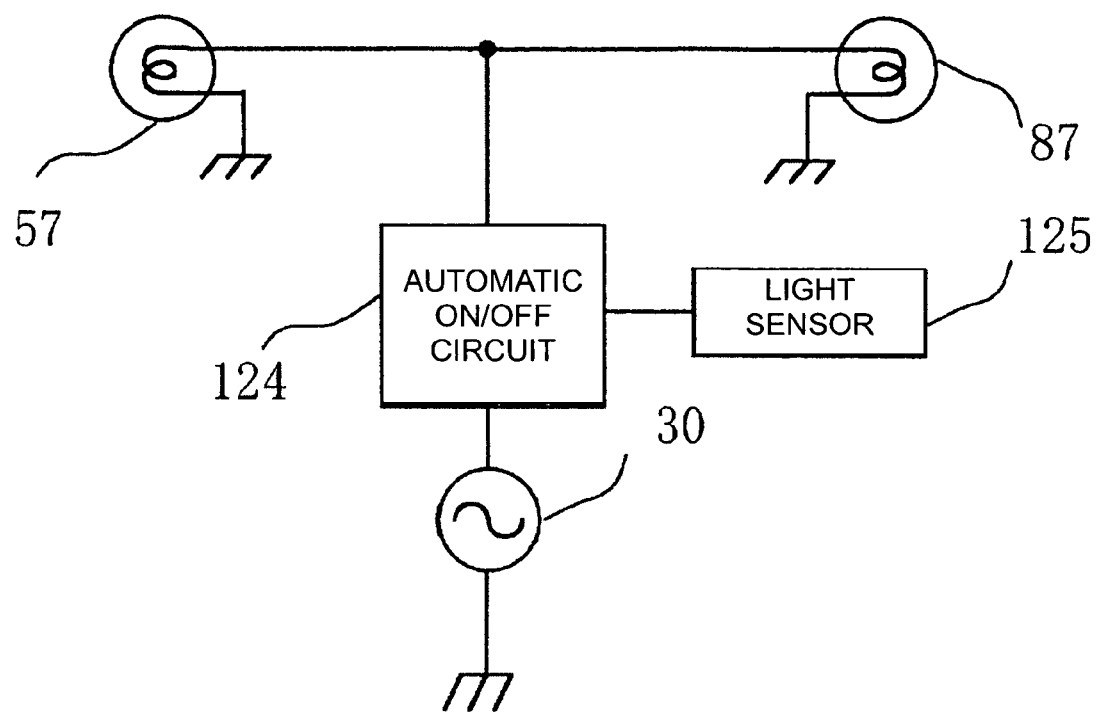
FIG. 10 is an alternate wiring diagram, similar to FIG. 6, for operating both lamps used in the front hub in accordance with the preferred embodiment of the present invention.
Figure 11:
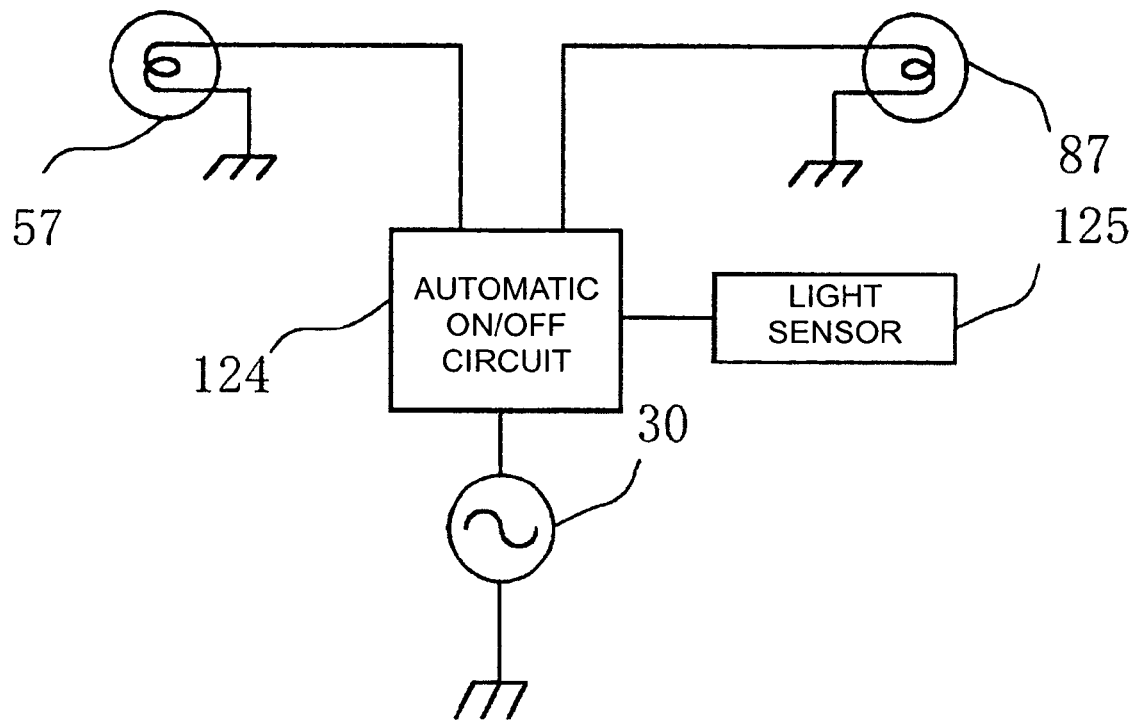
FIG. 11 is an alternate wiring diagram, similar to FIG. 6, for operating both lamps used in the front hub in accordance with the preferred embodiment of the present invention.

In FIGS. 10 and 11, the light bulbs 57 and 87 are connected in parallel. In FIG. 10 both light bulbs 57 and 87 are turned on and off simultaneously by the automatic on/off circuit 124. In FIG. 11 the light bulbs 57 and 87 are turned on and off separately by an automatic on/off circuit 124 provided with two switch circuits. In the latter case, it is also acceptable to configure the automatic on/off switch 124 to turn only one bulb on when the illuminance detected by the light sensor 125 indicates that the surroundings are comparatively bright (e.g., at dusk) and turn on both bulbs 57, 87 when the surroundings become dark.

It is also acceptable to configure the automatic on/off circuit 124 to control the on/off state of the two bulbs 57 and 87 in accordance with the bicycle speed using a signal from a speed sensor or a signal extracted from the generator 30 in accordance with the bicycle traveling speed. For example, the automatic on/off switch 124 could be configured to turn only one bulb on when bicycle travels at below a prescribed speed, e.g., less than 15 km/h, and turn on both bulbs 57 and 87 when the bicycle travels at a higher speed.

Figure 12:
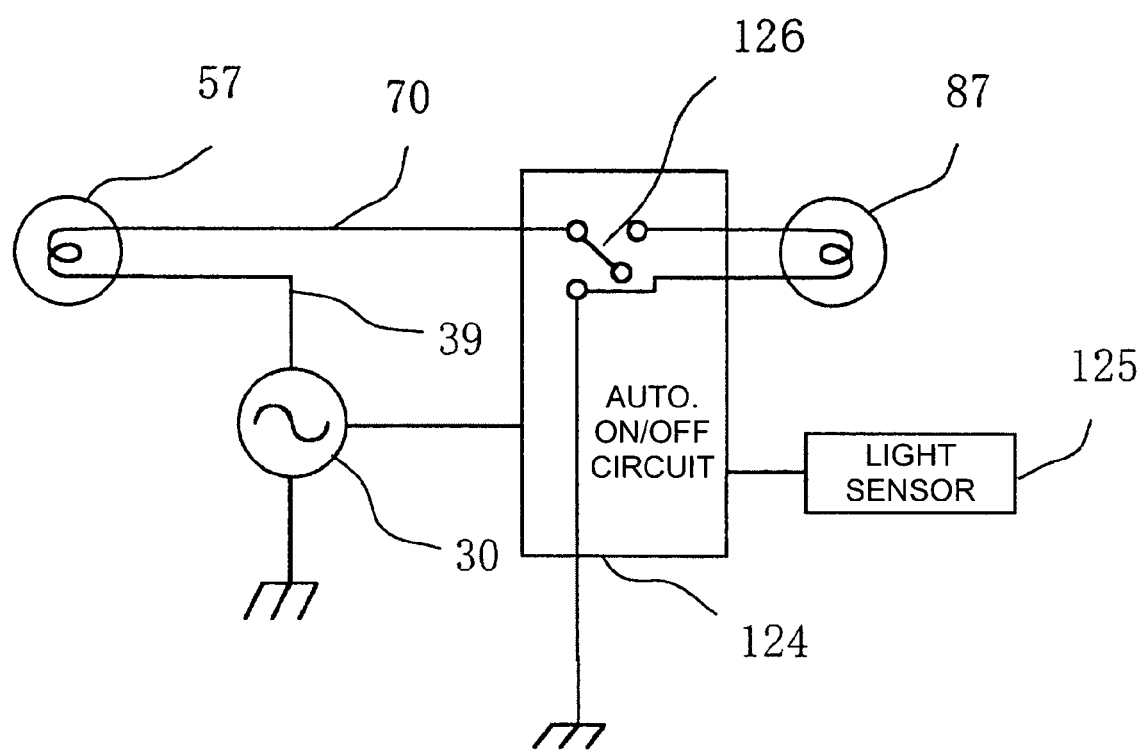
FIG. 12 is an alternate wiring diagram, similar to FIG. 6, for operating both lamps used in the front hub in accordance with the preferred embodiment of the present invention.

In FIG. 12, an automatic on/off circuit 124 having a three-position switch 126 is arranged along the wire 70 connecting the light bulbs 57 and 87, which are connected in series. The single switch 126 achieves the circuit configuration achieved by two switches 58 and 120 in FIG. 7. More specifically, the switch is provided with the following three positions: a position that turns the wire 70 on in order to turn on both light bulbs 57 and 87, a position that turns a short circuit on and grounds the wire 70 in order to turn the light bulb 87 off, and an intermediate position (the position shown in FIG. 12) that turns both light bulbs 57 and 87 off. The switch is configured to turn change positions in response to the output of the brightness sensor 125. As described previously, in addition to using the illuminance, it is also acceptable to control the on/off state of the two bulbs 57 and 87 in accordance with the bicycle speed using a signal from a speed sensor or a signal extracted from the generator 30 in accordance with the bicycle traveling speed. For example, the automatic on/off switch 124 could be configured to set the switch 126 to a position where only the light bulb 57 turns on when the bicycle travels at a below a prescribed speed of, e.g., less than 15 km/h, and to a position where the wire 70 is turned on and both light bulbs 57 and 87 turn on when the bicycle travels at a higher speed.

(d) Although in the previous embodiment the bicycle hub was presented as a front hub 1, the present invention can also be applied to a rear hub. For example, the invention can be applied to a case in which the lamp unit is a tail light or a directional indicator lamp.

(e) Although in the previous embodiment two lamp units were provided, the number of lamp units is not limited to two. It is also acceptable to have one lamp unit or three or more lamp units.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-090569. The entire disclosure of Japanese Patent Application No. 2003-090569 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
a hub shaft configured and arranged to be mounted in a non-rotatable manner to a bicycle frame;
a hub shell having a hollow interior with the hub shaft being disposed in the hollow interior of the hub shell;
a bearing arrangement arranged between the hub shell and the hub shaft in such a manner that the hub shell can rotate freely with respect to the hub shaft;
an electricity generating mechanism arranged inside the hub shell and configured to generate electricity in response to relative rotation of the hub shell with respect to the hub shaft; and
a first lamp arranged at one end of the hub shell and illuminated using electricity generated by the electricity generating mechanism, the first lamp including a bracket non-rotatably mounted on the hub shaft even when the bicycle hub is not attached to a bicycle frame but to permit axial movement of the bracket relative to the hub shaft during assembly of the bracket to the hub shaft,
the bracket being axially retained on the hub shaft by a nut threadedly mounted on the hub shaft even when the bicycle hub is not attached to a bicycle frame, and
the first lamp including a casing member non-rotatably attached to the bracket, the casing member being sized to receive the nut therethrough so that the casing member is mountable to and removable from the bracket without detaching the nut from the hub shaft.

2. The bicycle hub as recited in claim 1, wherein
the casing member is attached to the bracket at a location radially outwardly of an outer surface of the nut.

3. The bicycle hub as recited in claim 1, wherein
the hub shaft includes a quick release mechanism having a skewer, a head member and a quick release nut, one of the head member and the quick release nut being axially spaced from the nut retaining the bracket to receive the frame therebetween when the bicycle hub is attached to the bicycle frame.

4. The bicycle hub as recited in claim 1, further comprising
at least one switch arranged in a circuitry between the electricity generating mechanism and the first lamp for turning the lamp on and off.

5. The bicycle hub as recited in claim 4, wherein
the switch is configured to be turned on and off manually.

6. The bicycle hub as recited in claim 4, further comprising
an illuminance sensor configured and arranged to detect ambient brightness surrounding the bicycle; and
the switch is configured to turn on and off in response to an output from the illuminance sensor.

7. The bicycle hub according to claim 1, further comprising:
a second lamp illuminated using electricity generated by the electricity generating mechanism, the second lamp being arranged at an opposite end of the hub shell from the first lamp.

8. The bicycle hub as recited in claim 7, wherein
each of the first and second lamps is arranged between the frame and one end of the hub shell.

9. The bicycle hub as recited in claim 7, wherein
the first and second lamps are connected in series with respect to the electricity generating mechanism.

10. The bicycle hub as recited in claim 7, wherein
the first and second lamps are connected in parallel with respect to the electricity generating mechanism.

11. The bicycle hub as recited in claim 7, wherein
each of the first and second lamps is mounted in a non-rotatable manner to the hub shaft.

12. the bicycle hub as recited in claim 7, further comprising
at least one switch arranged in a circuitry between the electricity generating mechanism and the first and second lamps for turning the first and second lamps on and off.

13. The bicycle hub as recited in claim 12, wherein
the switch is configured to be turned on and off manually.

14. The bicycle hub as recited in claim 12, further comprising
an illuminance sensor configured and arranged to detect ambient brightness surrounding the bicycle; and
the switch is configured to turn on and off in response to an output from the illuminance sensor.

15. The bicycle hub as recited in claim 12, wherein
each of the first and second lamps is mounted in a non-rotatable manner to the hub shaft.

16. The bicycle hub as recited in claim 12, wherein
each of the first and second lamps is arranged between the frame and one end of the hub shell.

17. The bicycle hub as recited in claim 12, wherein
the first and second lamps are connected in series with respect to the electricity generating mechanism.

18. The bicycle hub as recited in claim 12, wherein
the first and second lamps are connected in parallel with respect to the electricity generating mechanism.

19. The bicycle hub as recited in claim 1, wherein
the bracket and the hub shaft having a protrusion and groove arrangement disposed therebetween to prevent rotational movement between the bracket and the hub shaft even when the bicycle hub is not attached to a bicycle frame but to permit axial movement of the bracket relative to the hub shaft during assembly of the bracket to the hub shaft.

20. The bicycle hub as recited in claim 19, wherein
the bracket includes the protrusion and the hub shaft includes the groove.

21. The bicycle hub as recited in claim 20, wherein
a wire extends from the electricity generating mechanism within the groove.

22. The bicycle hub as recited in claim 21, wherein
the bracket includes a wire slit extending radially outwardly of the protrusion, and the wire extends radially outwardly from the groove adjacent the protrusion and extends axially through the wire slit.

* * * * *